United States Patent
Reynaerts et al.

(10) Patent No.: US 7,728,488 B2
(45) Date of Patent: Jun. 1, 2010

(54) POSITIONING MOTOR AND APPARATUS (75) Inventors: Dominiek Reynaerts, Haasrode (BE);
Hendrik Van Brussel, Kessel-Lo (BE);
Wim Van De Vijver, Kruibeke (BE)

(73) Assignee: Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 12/302,409

(22) PCT Filed: May 25, 2007

(86) PCT No.: PCT/BE2007/000052

§ 371 (c)(1),
(2), (4) Date: Feb. 24, 2009

(87) PCT Pub. No.: WO2007/137372

PCT Pub. Date: Dec. 6, 2007

(65) Prior Publication Data
US 2009/0267451 A1    Oct. 29, 2009

(30) Foreign Application Priority Data

May 25, 2006  (GB) ................................. 0610332.9
May 29, 2006  (EP) ................................. 06447073
May 30, 2006  (GB) ................................. 0610566.2

(51) Int. Cl.
*H02N 2/00*  (2006.01)

(52) U.S. Cl. ................... 310/323.17; 310/323.02; 310/323.04; 310/329

(58) Field of Classification Search ........... 310/323.01, 310/323.02, 323.04, 323.06, 323.16, 323.17, 310/328, 329
See application file for complete search history.

(56) References Cited

U.S. PATENT DOCUMENTS 6,713,943 B1    3/2004  Matsuda et al.

(Continued)

FOREIGN PATENT DOCUMENTS

EP    0297574 A    1/1989

(Continued)

OTHER PUBLICATIONS

Van de Vijver, W., et al. "A multi-DOF positioning stage based on novel piezoelectric resonant drive modules." 2006 IEEE Ultrasonics Symposium, Vancouver, Canada, Oct. 3-6, 2006, pp. 164-167, XP002463480.

*Primary Examiner*—Thomas M Dougherty
(74) *Attorney, Agent, or Firm*—The Marbury Law Group, PLLC (57) ABSTRACT

A piezoelectric motor has a stator module (1), comprising two pairs of piezoelectric actuators (1a, 1b) and (2a, 2b) inside this stator module. The stator module is fixed by a central fixing point (A). The piezoelectric actuators (1a, 1b, 2a, 2b) are connected to the stator module via flexible or biasing elements (3), such as for instance hinges, for instance elastic hinges. The stator module (1) comprises a tuning mechanism (4), comprising at least one mass (4a, 4b) and at least one flexible or biasing element (5a, 5b, 5c, 5d), for instance leaf springs. The stator module (1) is contacted to a driven part (6), for instance a slider, at the contact point (A). The piezoelectric motor is designed such that contact point (B) is able to produce a closed trajectory, thereby inducing a relative motion of the driven part (6). The contact point (B) is moved by applying an electric field to actuators (1a and 1b) and/or by applying an electric field to actuators (2a and 2b).

12 Claims, 11 Drawing Sheets

U.S. PATENT DOCUMENTS

| | | | |
|---|---|---|---|
| 7,187,107 B2 * | 3/2007 | Chu et al. | 310/328 |
| 7,218,032 B2 * | 5/2007 | Kim | 310/323.17 |
| 2005/0006983 A1 * | 1/2005 | Witteveen | 310/323.01 |
| 2009/0058227 A1 * | 3/2009 | Takahashi et al. | 310/323.16 |

FOREIGN PATENT DOCUMENTS

| | | | |
|---|---|---|---|
| JP | 62-60482 | * | 3/1987 |
| JP | 02-095181 A | | 4/1990 |
| WO | WO 99/59192 A | | 11/1999 |

\* cited by examiner

Horitzontal Vibration mode    Vertical Vibration mode

POSITIONING MOTOR AND APPARATUS

BACKGROUND OF THE INVENTION

The invention relates to a motor, more particularly a piezoelectric motor, which is designed to work simultaneously in a resonant vibration mode and a direct positioning mode. The resonant vibration mode will cause a mechanical element for instance a stator module to vibrate so that a relative movement of a driven part over a large travel is possible while the direct positioning mode will deform the stator module so that at the same time a fine motion control is possible.

Each stator module comprises at least 2 actuators which are electrically excited as to provoke the resonant vibration mode or to deform the stator module for the direct positioning mode. The invention also involves a novel mechanism to optimize the working efficiency of a motor that can simultaneously operate in a resonant vibration mode and a direct positioning mode. The motor can be used as a linear motor, a rotational motor or a planar motor.

STATE OF THE ART

Recent technologies require positioning systems that are not only precise (for instance a resolution of 1 nm or better) but that are also fast (more than 100 mm/s). The motor of present invention was found to meet these requirements. The motor uses piezoelectric actuators to obtain a high positioning speed of about 1000 mm/s and to achieve an infinite resolution of movement.

Although several ultrasonic motors operating by a resonant vibration mode have been designed over the last years (U.S. Pat. No. 5,136,200; EP 0 313 072 A1; U.S. Pat. No. 4,613,782; U.S. Pat. No. 5,852,336; U.S. Pat. No. 6,147,436), they cannot be combined with a direct positioning mode. However, a disadvantage of piezoelectric ultrasonic motors is their limited positioning resolution. Piezoelectric motors of the state of the art show a strong non-linear behaviour at low speeds, which limits the performance.

The document U.S. Pat. No. 6,147,436 A describes a piezoelectric motor that can work in a resonant vibration mode and a direct actuator operation. However, as the authors state, both operation modes will not occur at the same time. In this case, the resonant vibration mode will be used when the position error is beyond a certain limit. When the position error is comprised under a threshold value, the resonant vibration mode is shut off and the direct operation mode is used. This working method makes it impossible to use the described piezoelectric motor for trajectory control where at all times a fine positioning resolution is required.

Piezoelectric motors of the state of the art are incompatible with the principle proposed in this document because of its special structure.

SUMMARY OF THE INVENTION

A piezoelectric motor has a stator module 1, comprising two pairs of piezoelectric actuators 1a, 1b and 2a, 2b inside this stator module. The stator module is fixed by a central fixing point (A). The piezoelectric actuators 1a, 1b, 2a, 2b are connected to the stator module via flexible or biasing elements 3, such as for instance hinges, for instance elastic hinges. The stator module 1 comprises a tuning mechanism 4, comprising at least one mass 4a, 4b and at least one flexible or biasing element 5a, 5b, 5c, 5d, for instance leaf springs. The stator module 1 is contacted to a driven part 6, for instance a slider, at the contact point (A).

The piezoelectric motor is designed such that contact point (B) is able to produce a closed trajectory, thereby inducing a relative motion of the driven part 6. The contact point (B) is moved by applying an electric field to actuators 1a and 1b and/or by applying an electric field to actuators 2a and 2b.

Present invention achieved a piezoelectric motor which can move a driven part with a large travel and high speed while maintaining a high position resolution of the driven part.

In a particular embodiment the piezoelectric motor according to this invention is characterised in that:

The stator module is symmetric around the central fixing point.

The stator module comprises preferably four piezoelectric actuators. Preferably 1 set is used for operation in the resonant vibration mode, whereas 1 set is used for the direct positioning mode.

The stator module can comprise a tuning mechanism to achieve a high efficiency in the resonant vibration mode. By changing the mass of the tuning mechanism, the horizontal and vertical vibration modes are tuned in order to coincide both vibrations which guarantees a good efficiency.

The present invention concerns a motor with at least one contacting zone (B) for making contact with a driven part (6), characterised in that the motor is arranged to realise a relative motion with the driven part (6) in a simultaneous resonant vibration mode and direct positioning mode by a stator module (1) with at least one set of actuators (2a,2b) to excite the resonant vibration mode and with at least one set of actuators (1a,1b) to perform a direct positioning mode or it may concern a motor, comprising a stator module (1) and actuators mounted into or onto the stator module and at least one contacting zone (B) for making contact with a driven part (6) whereby the motor is arranged to move the driven part simultaneous in a resonant vibration mode and in a direct positioning mode by the stator module that comprises at least one set of actuators (2a,2b) to excite the resonant vibration mode and at least one set of actuators (1a,1b) to perform a direct positioning mode. In such motor the stator module (1) can be symmetric around the central fixing point (A) and comprises four actuators (1a, 2a, 1b, 2b), whereof 1 set (2a,2b) is usable for operation in the resonant vibration mode and 1 set (1a,1b) is used for the direct positioning mode.

In a particular embodiment of present invention, the motor further comprises a tuning mechanism (4) comprising at least one mass (4a,4b) and one flexible or biasing body (5a,5b,5c, 5d) attached to the stator module (1) that enables tuning of the perpendicular (for instance horizontal and vertical) vibration modes. Such tuning mechanism can be a mass modification mechanism in order to coincide both perpendicular vibration frequencies. The drive speed of the relative motion between the stator module (1) and said driven part (6) is controllable by adapting the phase between the excitation of the piezoelectric actuators 1a and 1b or 2a and 2b. The phase between the excitation of the actuators 1a and 1b or 2a and 2b can also be adaptable to control the thrust force of the relative motion between the stator module (1) and said driven part (6).

In a particular embodiment the stator comprises 2 actuators.

The present invention also concerns an apparatus that comprises one or more of the motors of present invention and that is controllable to allow the simultaneous combination of these motors to position the apparatus in one or more degrees of freedom when they are working in a resonant vibration mode or a direct positioning mode in a sequence or a combination thereof. Such apparatus may further comprise a mobile unit, wherein the mobile unit is driven by the motor and the drive function and the bearing function may be carried out by the motors of present invention. The errors in the bearing degrees of freedom can be actively compensated by applying a DC voltage signal to any of the actuators 1a, 1b of each respective motor. In a particular embodiment the apparatus is operatable by 3 motors which are operatable in a resonant mode and are positioned within a relative angle of 120 degrees. The actuators in the motor can be actuators of the group consisting of piezoelectric actuators, electrostrictive actuators and magnetostrictive actuators.

ILLUSTRATIVE EMBODIMENTS OF THE PRESENT INVENTION

Operation of the stator module 1 of the piezoelectric motor according to the invention is based on the simultaneous operation in the resonant vibration mode and the direct positioning mode. As such the resultant motion of the driven part 6 consists of a motion caused by the resonant vibration mode and a correction motion carried out by the direct positioning mode.

1. The Resonant Vibration Mode

When piezoelectric actuators 1a and 1b or 2a and 2b are deformed in opposition, for instance anti-phase operation, at a predefined frequency, the horizontal vibration mode is excited. This will cause a strongly enlarged vibration of the contact point (B) in horizontal direction. When piezoelectric actuators 1a and 1b or 2a and 2b are deformed in identical manner, for instance phase operation, at a predefined frequency, the vertical vibration mode is excited. This will cause a strongly enlarged vibration of the contact point (B) in vertical direction.

Optimal efficiency is achieved when these two vibration modes occur at the same frequency. The tuning mechanism 4 comprises a mass 4a, 4b connected to the surrounding stator module 1 with flexible or biasing elements 5a, 5b. In a preferred embodiment these flexible or biasing elements, for instance leaf springs, are stiff in horizontal direction and flexible in vertical direction. Due to this arrangement the horizontal vibration mode will change in frequency while the vertical vibration mode will remain unchanged by changing the mass 4a, 4b. Thus, the stator module can be tuned to obtain optimal working efficiency.

When the piezoelectric actuators 2a and 2b are operated with a phase difference, for example in quadrature, both the horizontal and vertical vibration mode will be excited. This will result in a closed trajectory of the contact point (B), for example elliptical. The trajectory of this contact point (B) will allow the stator module 1 to drive the driven part 6. It is clear for people skilled in the art that the working principle is not limited by vertical and horizontal vibrations. The essence is that the vibrations are perpendicular relative to each other. The drive speed of this driven part can be controlled by respectively the frequency, the amplitude and the phase of the piezoelectric actuators. Via a phase drive operation the characteristic "dead zone" is eliminated, which will allow for a precise positioning.

2. Direct Positioning Mode

When piezoelectric actuators 1a and 1b are deformed in opposition by applying a DC voltage to the respective actuators, the contact point (B) is moved horizontally. The generated displacement is proportional to the applied voltage, through friction this motion is transferred to the driven part 6. The direct positioning mode allows actuating the driven part 6 over a short stroke with a high positioning resolution of movement, which is very interesting for precision applications.

3. Combined Operation

One can see that if piezoelectric actuators 2a and 2b are operated at the resonance frequency in order to work in the resonant vibration mode and piezoelectric actuators 1a and 1b are actuated in the direct positioning mode, a simultaneous operation of the resonant vibration mode and the direct positioning mode is possible. The resulting motion of the contact point (B) will be a superimposed motion: an elliptical trajectory due to the high frequent vibration of the resonant vibration mode and a low-frequent horizontal motion due to the direct positioning mode. The resulting positioning performance of the driven part is also a superposition of both working modes. A high speed and large travel is achieved by working in the resonant vibration mode while the direct actuation mode will allow a high positioning resolution.

DESCRIPTION OF THE FIGURES

FIG. 1 is a view of a stator module of present invention. Numbers in this figure: 1a, 1b, 2a, 2b=piezoelectric actuator; 1=stator module, 4=tuning mechanism, 4a,4b=tuning mass, 5a,5b, 5c, 5d=biased elements, for instance leaf springs, 6=driven part, A=fixing point, B=contact point FIG. 2 shows an example of the motor mounted into a linear drive unit. Numbers in this figure: 1a, 1b, 2a, 2b=piezoelectric actuator; 1=stator module, B=contact point, 6=driven part, 4a, 4b=tuning mass, 5a, 5b, 5c, 5d=biased elements, for instance leaf springs, A=fixing point, 7=fixed frame, 8=prestress bold, 9=flexure guiding FIG. 3 demonstrates the direct positioning mode: actuation to the right is demonstrated Piezoelectric actuator 1a is expanded while piezoelectric actuator 1b is retracted: this will induce a net motion of the contact point B and hence the driven part 6 to the right.

DESCRIPTION OF A PREFERRED EMBODIMENT

Figure 1:
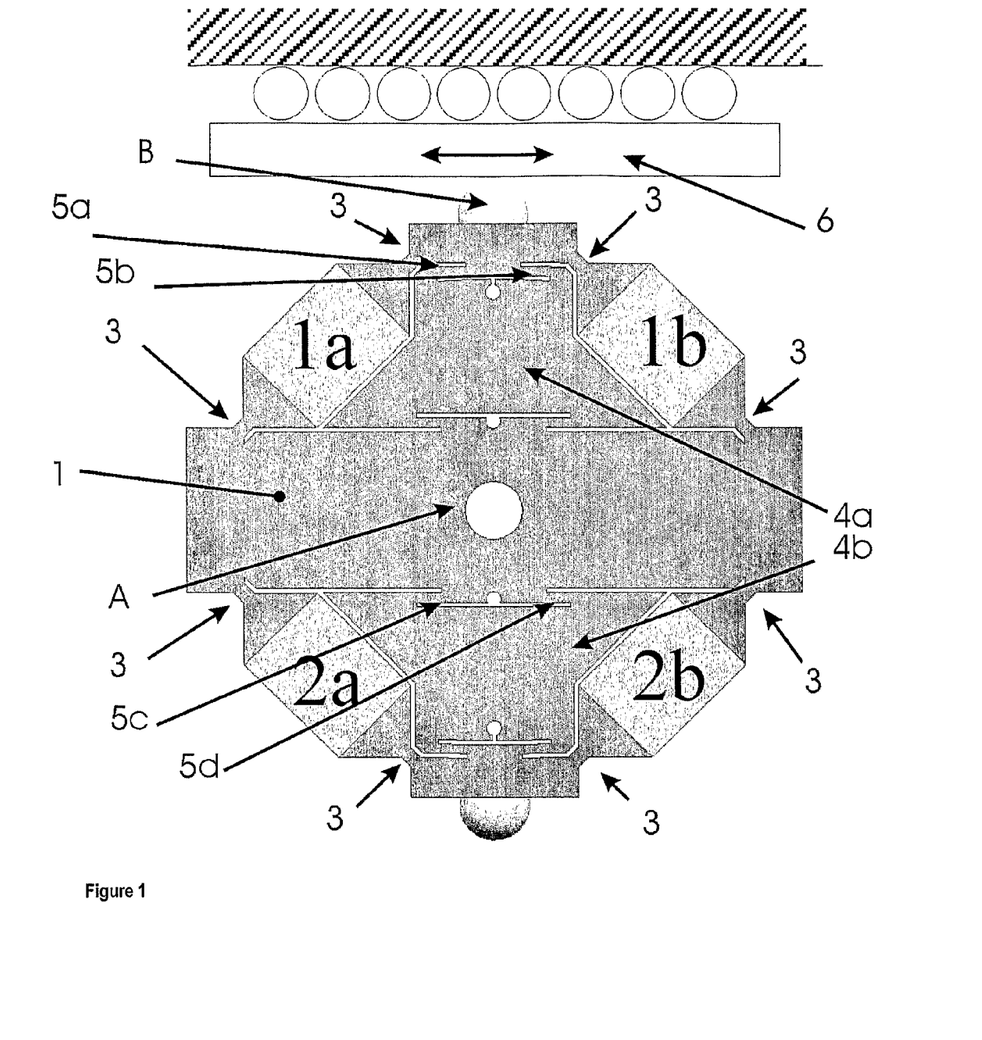

FIG. 1 shows a drawing of the motor. It comprises a stator module (1) which is pre-stressed via a contact point (B) against a driven part, for instance a slider (6). The piezoelectric actuators (1a-1b-2a-2b) are mounted inside the stator module (1). Hinges (3), for instance flexible hinges, connect the piezoelectric actuators to the fixing point (A) and the contact point (B). The piezoelectric actuators are pre-stressed via biased elements, for instance leaf spring, (5) and a tuning mass (4). The stator module (1) is mounted to a fixed frame at the fixing point (B).

Figure 2:
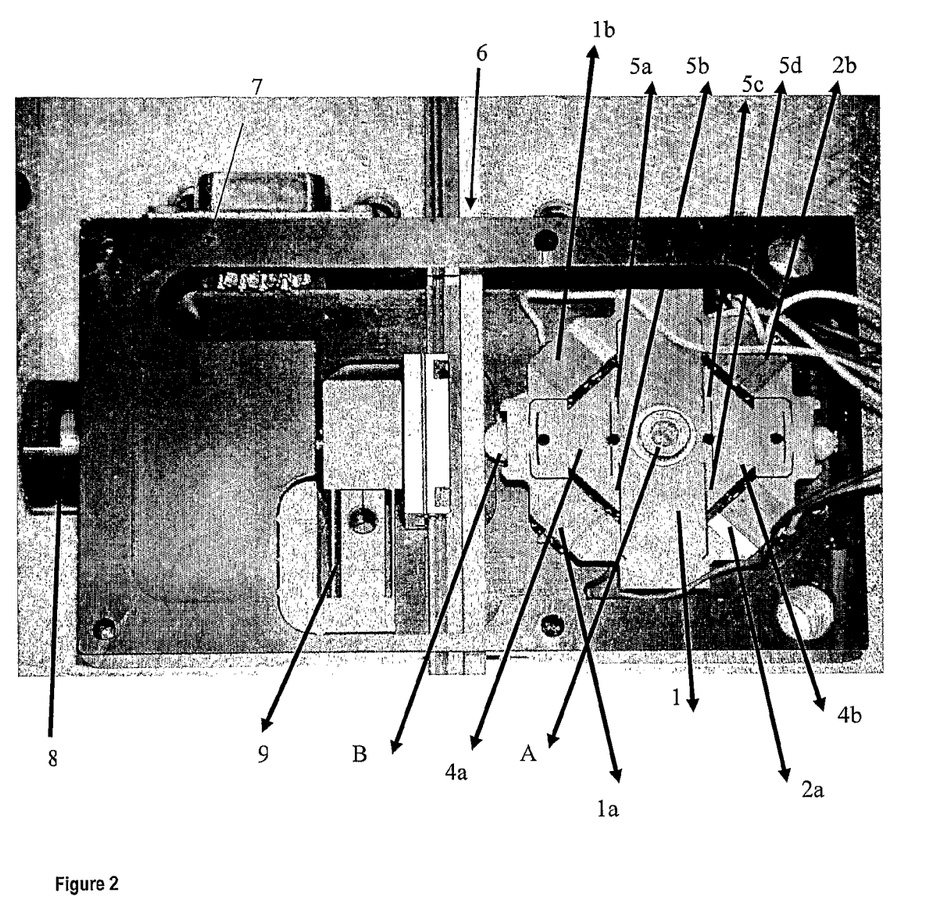

FIG. 2 shows how the stator module (1) is incorporated into a linear drive. Via a pre-stress bolt (8) and a flexure guiding (9), the driven part, for instance slider (6) is pre-stressed against the stator module (1). The developed piezoelectric motor combines 2 operation modes: a direct positioning mode and a resonant operation mode providing a high drive speed.

The Operation Modes

Direct Positioning Mode

In the direct positioning mode, the actuator can be classified as a flexure nanopositioner. This mode allows actuating the driven part 6 over a short stroke with a high positioning resolution of movement, which is very interesting for precision applications.

Figure 3:
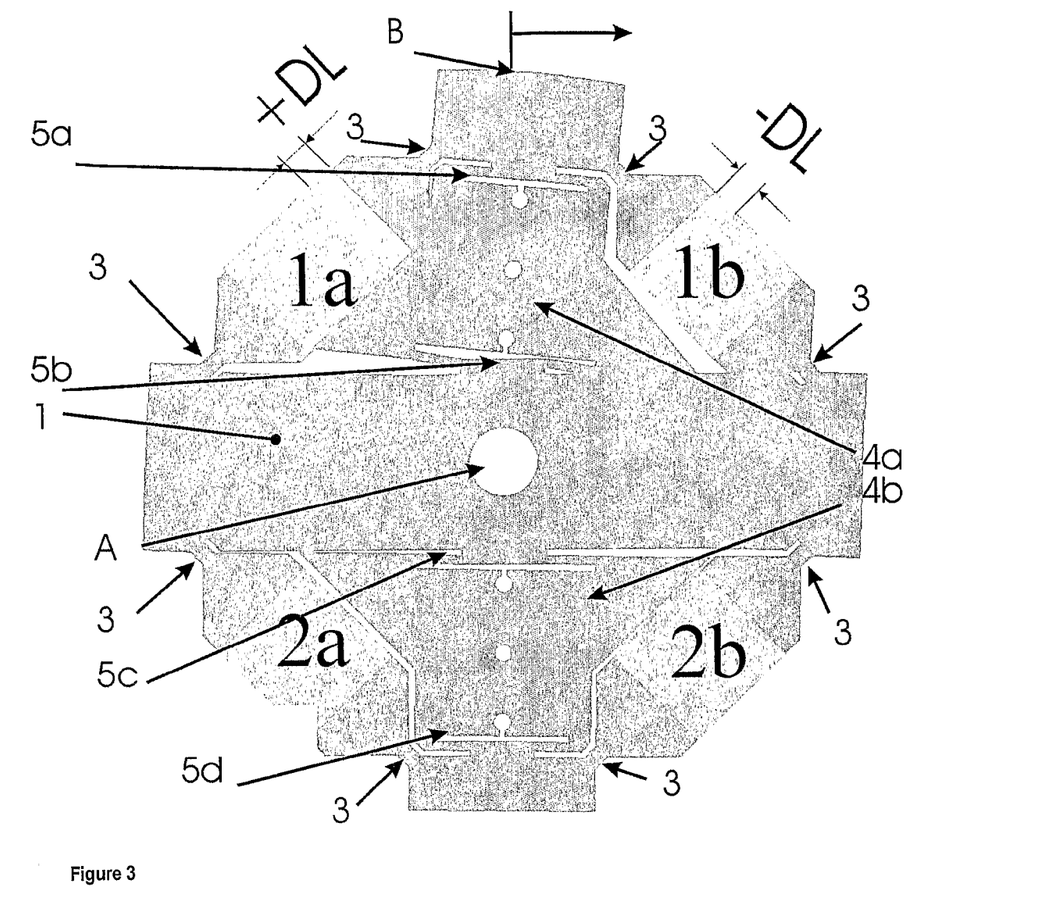

The actuator operates as follows: first, a driven part 6 is prestressed onto the stator module 1, then, by expanding piezoelectric actuator 1a and retracting piezoelectric actuator 2a, the driven part, which can be slidable or rotatable members for instance a slider, wheel or roller ball or other slidable or rotatable element, is actuated. The generated displacement is proportional to the applied voltage. This actuation is based on friction between the stator module 1 and the driven part 6, means a slider, wheel or roller ball. The operation principle is illustrated in FIG. 3.

This operation mode can have an infinite resolution of movement, but its stroke is limited to a few μm.

Resonant Vibration Mode

Figure 4:
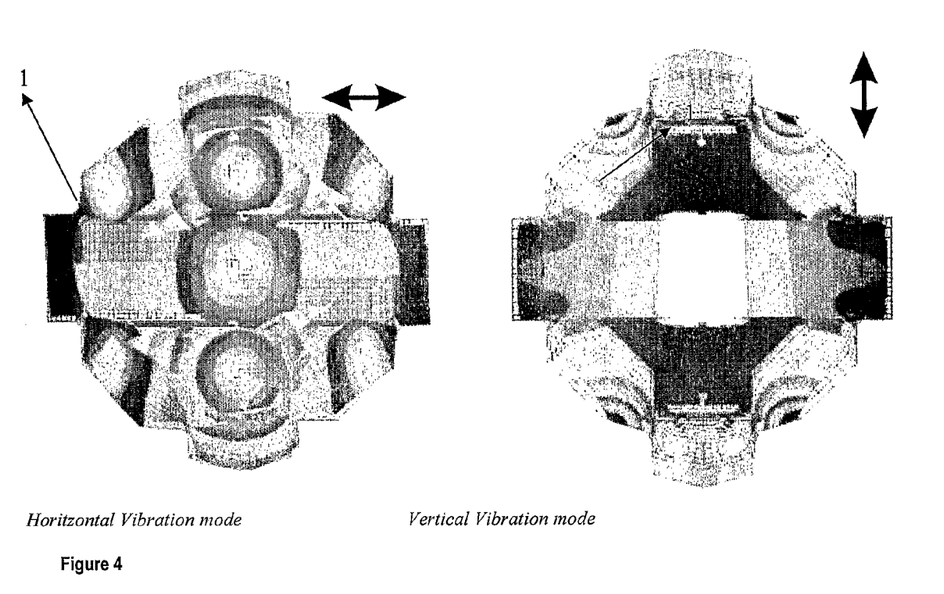
FIG. 4 demonstrates the used resonant vibration modes of the piezoelectric motor of present invention. The left figure shows the horizontal vibration mode, while the right figure shows the vertical vibration mode.
Figure 5:
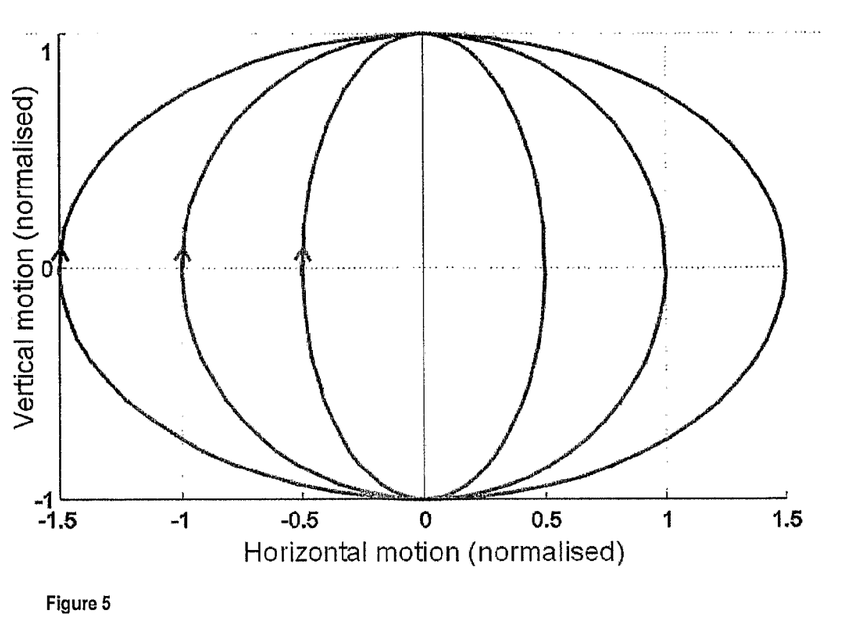
FIG. 5 illustrates the movement of the contact point (B) for different speeds of the driven part 6 with changing phase difference between the piezoelectric actuators 2a and 2b.

In the resonant vibration mode, the proposed motor can be classified as a bimodal ultrasonic motor. For displacement at higher velocities, the resonant operation mode is used. The driving principle of the stator module 1 in the resonant operation mode is based on the generation of a closed trajectory, for example an elliptical motion, of the contact point (B) driving a driven part 6 by a friction contact. An example of such a closed trajectory is shown in FIG. 5. In order to optimize efficiency it is advantageous to maximize the horizontal and vertical vibration amplitude of this elliptical motion. When operating the stator module 1 in resonance, the stroke is largely amplified. Large horizontal amplitude will ensure a high positioning speed while high vertical amplitude is needed for a high traction force. FIG. 4 shows the FEM-modelling of the horizontal, respectively the vertical vibration modes of the stator module 1.

Optimal efficiency is achieved when these two vibration modes occur at the same frequency. Designing a stator module with coinciding vibration modes is not straightforward. Moreover, as the stator module is optimized for performance in direct positioning mode, no design parameters are left over to get coinciding vibration modes. The piezoelectric motor of presented invention uses a novel concept to make the horizontal and vertical eigenfrequencies coincide. FIG. 1 shows a tuning mass (4a and 4b) which is connected via a biased element, for instance leaf springs (5) to the contact point (B) and the fixed point (A). This tuning mass acts as a modal mass for the horizontal vibration mode. Due to the biased element connection 5 it does not move for the vertical vibration mode, as can be seen on FIG. 4. This means that the position of the horizontal eigenfrequency will be more sensitive to a change of the tuning mass than the eigenfrequency of the vertical vibration modes. Adapting the tuning mass will allow for matching the eigenfrequencies on a clear and straightforward way.

Due to the particular dimensions of the biased element, for instance leaf springs 5—stiff in horizontal direction and flexible in vertical direction—the stemming of the eigenfrequencies can be done by just adapting the tuning mass 4 in FIG. 1.

For efficient application of the vibration energy, it is important to decouple the stator module 1 from its surrounding. On the other hand, to be able to work in the direct positioning mode, a stiff connection to the fixed frame is needed. The symmetrical construction will induce a central node at the symmetry point, i.e. point (A) in FIG. 1, of the stator module. When attaching the stator module to the fixed reference at this point, minimal vibration energy is lost to the environment leading towards an improved driving efficiency.

Moreover, the performance of the stator module is independent of the structure where it is attached to, thus improving design modularity. The speed in this resonant mode can be as large as 1000 mm/s. An important aspect of the invention is the independent control of the vertical amplitude and the horizontal amplitude of the trajectory of contactpoint (B) by controlling the amplitudes and phase shifts of the input voltages to the piezoelectric actuators 2a and 2b. FIG. 5 shows different elliptical motions of the contact point whereby the speed of the slider is changed while maintaining a constant thrust force. An important advantage of this combined phase and amplitude control is that the horizontal speed can be made arbitrary small, while maintaining sufficient thrust force to drive the driven part 6. This means that there is no 'dead zone' for low speeds; this is an important advantage of this piezoelectric motor over other resonant motors where no independent control of the vertical and the horizontal amplitude is possible.

Figure 11:
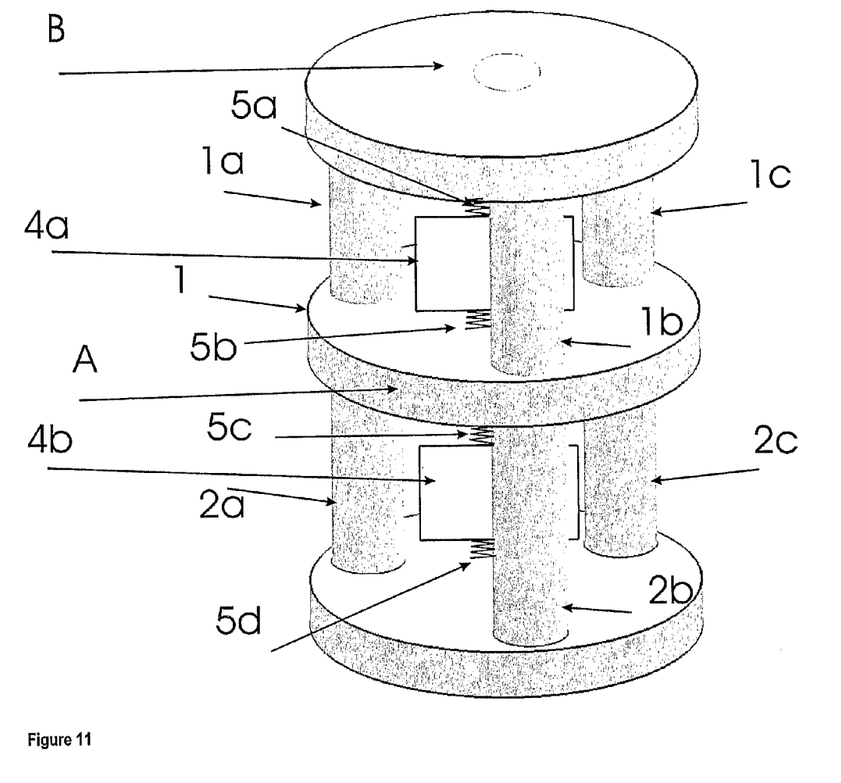
FIG. 11 is a view of a stator module of present invention in a 2D-version. Numbers in this figure: 1a, 1b, 1c, 2a, 2b, 2c=piezoelectric actuator; 1=stator module, 4a,4b=tuning mass, 5a,5b, 5c, 5d=biased elements, for instance leaf springs, A=fixing point, B=contact point

Previous working principles can be further extended to an alternative embodiment, where each set of piezoelectric actuators comprises more than 2 piezoelectric actuators. For example, FIG. 11 shows a 2 D-version of presented invention. In this case piezoelectric actuators 1a, 1b and 1c work in the direct positioning mode, whereas piezoelectric actuators 2a, 2b and 2c work in the resonant operation mode. In this configuration the piezoelectric motor is able to move a driven part 6 in 2 dimensions.

When two or more motors are integrated into a frame, a novel positioning system can be constructed. Apart from the driving function the motors also comprise a bearing function. For this, several of the presented motors have to support the stage. This functionality makes an active compensation of errors in the bearing degrees of freedom possible. For example, with 3 motors a positioning system with 2 translational and one rotational degree of freedom can be constructed without the use of any external bearing function. Moreover, the bearing degrees of freedom can be actively controlled to reduce the motion errors.

Figure 6:
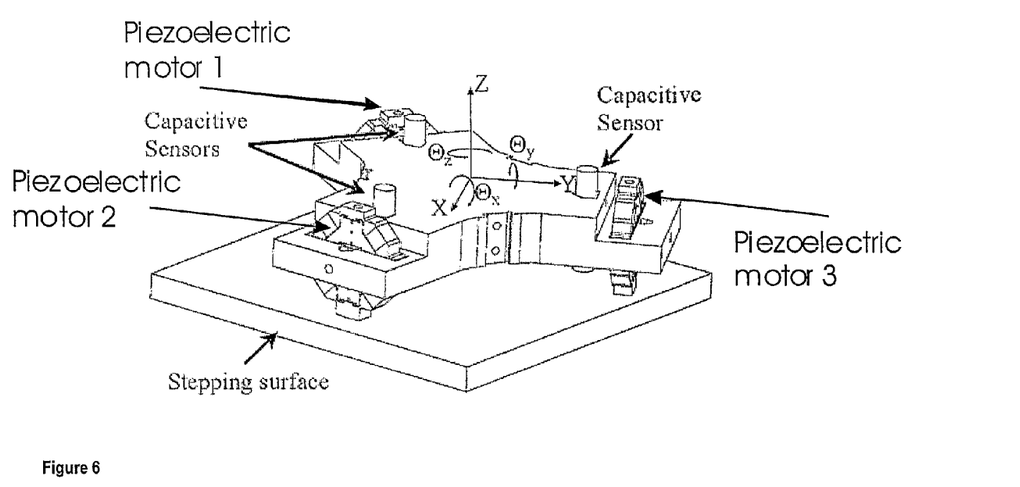
FIG. 6 displays an embodiment of present invention wherein the presented motors are integrated into an XY positioning system.

An embodiment of such a positioning system is given in FIG. 6.

Figure 7:
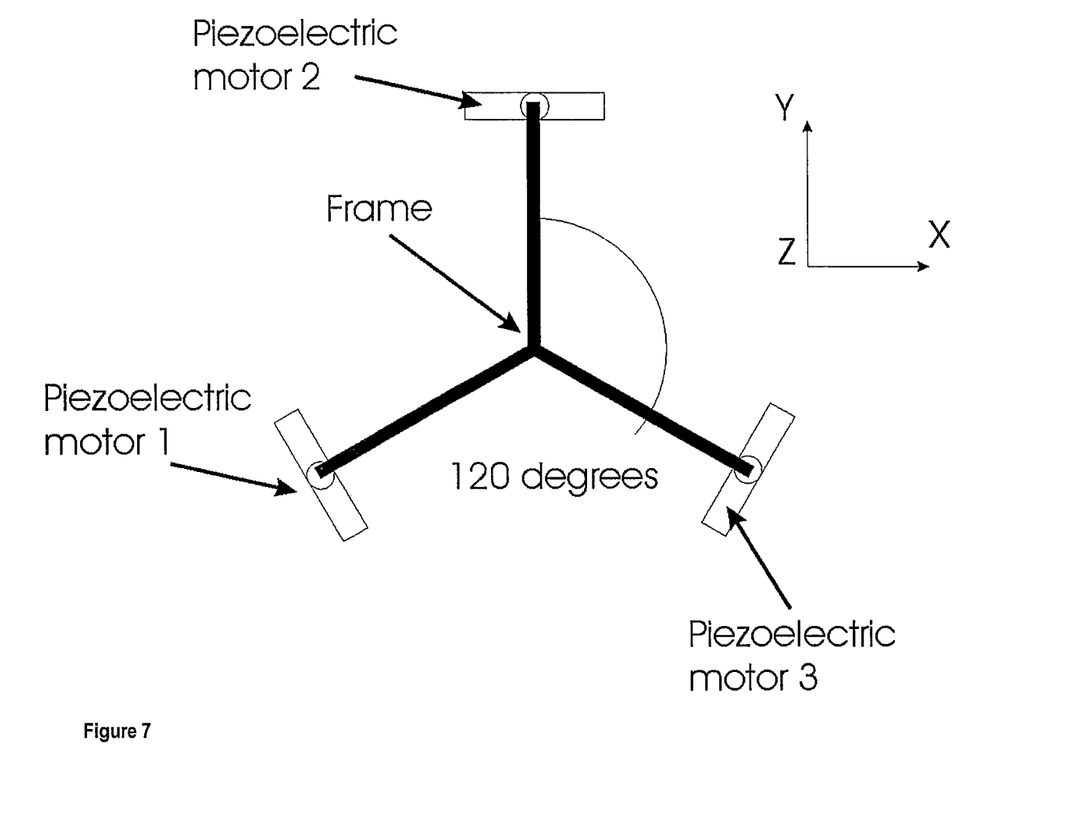
FIGS. 7-10 display a possible layout of a planar positioning system
Figure 8:
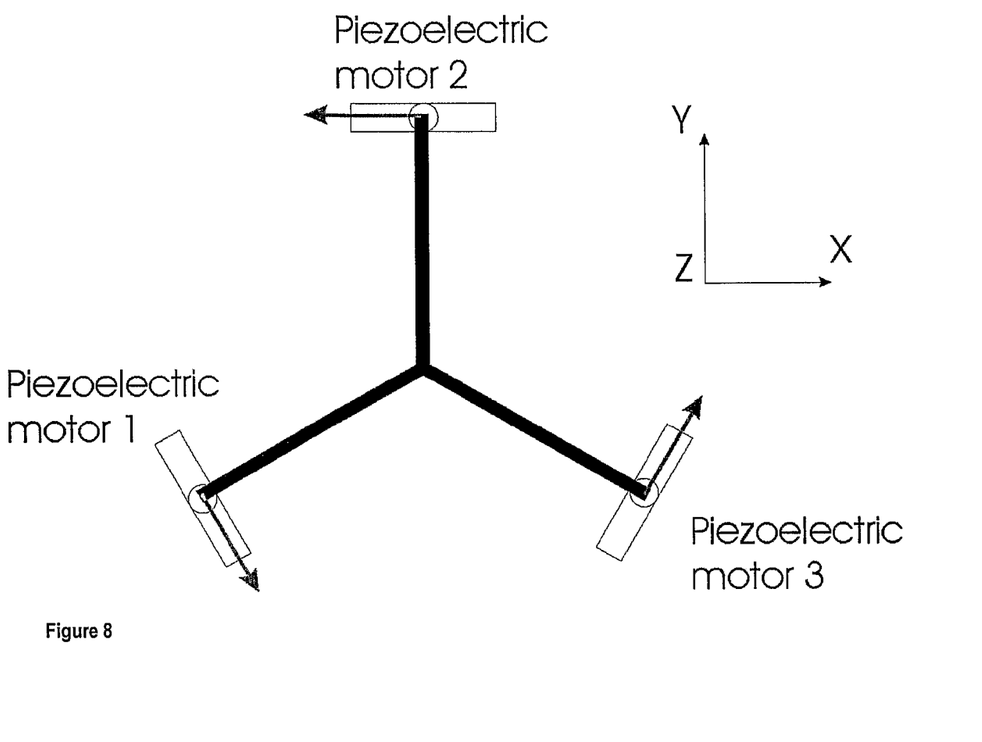
Figure 9:
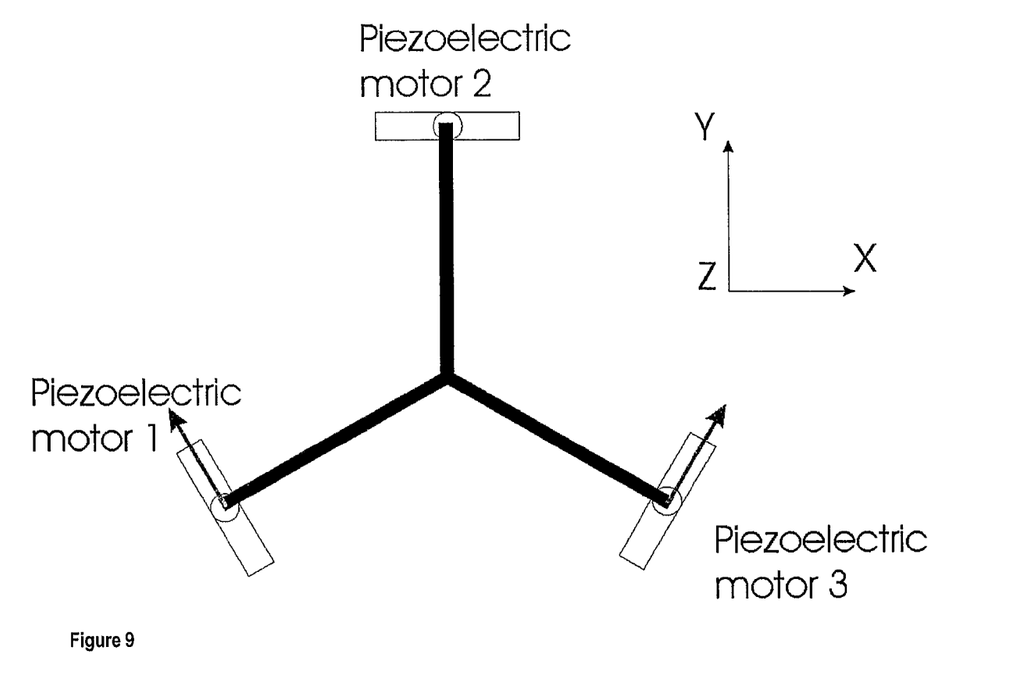
Figure 10:
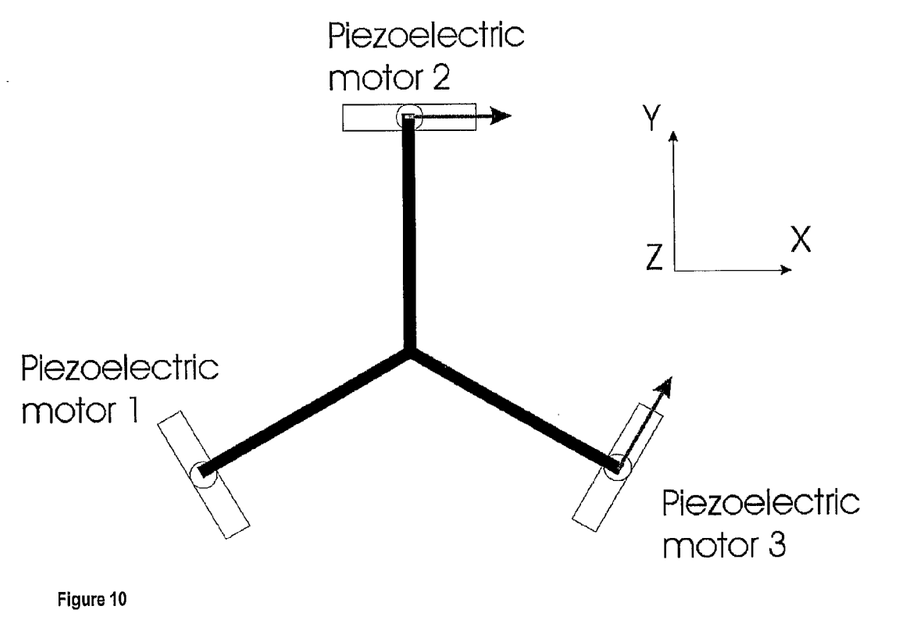

FIG. 7 shows the schematic layout. The stage is supported by 3 motors and positioned within a relative angle of 120 degrees. The 3 piezoelectric motors can work in the resonant operation mode, as described in the previous paragraphs. The combined operation of the 3 motors allows a large travel in X, Y and $\theta_z$. FIG. 8 explains how a movement in $\theta_z$ is made possible. The driving force vectors of the respective motors are represented by the arrows. When the arrows all have the same magnitude, a rotation in $\theta_z$ is carried out. FIG. 9 and FIG. 10 show how a motion in the XY-plane is possible by adapting the respective force vectors of the motors.

Another important advantage is that respectively the Z-, $\theta_x$- and $\theta_y$-position of the stage can be controlled by the linear drive modules. In all three operation modes, the height of the contact point (B) is adjustable: by extending or retracting both piezoelectric actuators 1a and 1b, the contact point (B) moves down or up, as seen in FIG. 6.

As these positions are measured with the 3 displacement sensors, for example capacitive sensors, active stiffness can be achieved by feedback control (see FIG. 6). A positioning system—driven and supported by resonant drive units—that is positioned by working in resonance in the drive degrees of freedom and where correction movements can be carried out at the same time and by the same modules in the other degrees of freedom is new compared to the state of the art.

The invention claimed is:

1. A motor comprising:
   at least one contacting zone for making contact with a driven part, wherein the motor realizes a relative motion with the driven part when operating in a simultaneous resonant vibration mode and direct positioning mode;
   a stator module with at least one set of actuators to excite the simultaneous resonant vibration mode and with at least one set of actuators to perform a direct positioning mode; and
   a tuning mechanism comprising at least one mass and one flexible biasing body attached to the stator module that enables tuning of the resonant vibration mode.

2. The motor of claim 1, wherein the stator module is symmetric around a central fixing point and wherein the at least one set of actuators to excite the simultaneous resonant vibration mode comprises two actuators and wherein the at least one set of actuators to perform a direct positioning mode comprises two actuators.

3. The motor of claim 1, wherein the tuning mechanism is a mass modification mechanism, wherein the simultaneous resonant vibration mode comprises a first vibration component that is orthogonal to a second vibration component and wherein tuning of the simultaneous resonant vibration mode causes the stator module to produce the first vibration component and the second vibration component at a common vibration frequency.

4. The motor of claim 1, wherein a drive speed of the relative motion between the stator module and said driven part is controllable by controlling a phase relationship between the excitation of the at least one set of actuators to excite the simultaneous resonant vibration mode and excitation of the at least one set of actuators to perform the direct positioning mode.

5. The motor of claim 1, wherein the phase between the excitation of the at least one set of actuators to excite the simultaneous resonant vibration mode and the phase between the excitation of the at least one set of actuators to perform the direct positioning mode is adaptable to control a thrust force of the relative motion between the stator module and said driven part.

6. The motor of claim 1, wherein the at least one set of actuators to excite the simultaneous resonant vibration mode comprises one actuator and wherein the at least one set of actuators to perform a direct positioning mode comprises one actuator.

7. An apparatus comprising one or more motors of claim 1, wherein the apparatus is controllable to allow a simultaneous combination of the one or more motors to position the apparatus in one or more degrees of freedom when operating in a mode selected from the group consisting of a simultaneous resonant vibration mode, a direct positioning mode in a sequence, and in a combination mode comprising the simultaneous resonant vibration mode and the direct positing mode.

8. The apparatus of claim 7, further comprising a mobile unit, wherein the mobile unit is driven by at least one of the one or more motors.

9. The apparatus of claim 1, wherein a drive function and a bearing function are carried out by the motor.

10. The apparatus of claim 7, wherein the apparatus is adapted to receive a DC voltage signal at at least one of the at least one set of actuators to excite the simultaneous resonant vibration mode and at at least one of the at least one set of actuators to perform the direct positioning mode to correct an error in a bearing degree of freedom.

11. The apparatus of claim 7, comprising three motors as claimed in claim 1, wherein the three motors are operable in a simultaneous resonant mode and are positioned at a stage within a relative angle of 120 degrees.

12. The motor of claim 1, wherein the sets of actuators are selected from the group consisting of piezoelectric actuators, electrostrictive actuators and magnetostrictive actuators.

* * * * *